United States Patent
Kang

(10) Patent No.: US 12,345,030 B2
(45) Date of Patent: Jul. 1, 2025

(54) WATER DISCHARGE UNIT AND WATER PURIFIER INCLUDING SAME

(71) Applicant: SAMSUNG ELECTRONICS CO., LTD., Suwon-si (KR)

(72) Inventor: Wanku Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 18/127,939

(22) Filed: Mar. 29, 2023

(65) Prior Publication Data

US 2023/0235541 A1    Jul. 27, 2023

Related U.S. Application Data

(63) Continuation of application No. PCT/KR2021/010598, filed on Aug. 10, 2021.

(30) Foreign Application Priority Data

Oct. 8, 2020    (KR) .................. 10-2020-0130515

(51) Int. Cl.
   *E03C 1/05*    (2006.01)
   *E03C 1/04*    (2006.01)
   *E03C 1/044*   (2006.01)

(52) U.S. Cl.
   CPC ............ *E03C 1/055* (2013.01); *E03C 1/0404* (2013.01); *E03C 1/0412* (2013.01); *E03C 2001/0415* (2013.01); *E03C 1/044* (2013.01)

(58) Field of Classification Search
   CPC ...... E03C 1/055; E03C 1/0404; E03C 1/0412; E03C 1/044; E03C 2001/0415;
   (Continued)

(56) References Cited

U.S. PATENT DOCUMENTS 9,216,368 B1 * 12/2015 Williams .................. C02F 9/20
10,408,533 B2    9/2019 Kim et al.
(Continued)

FOREIGN PATENT DOCUMENTS

CN      106284536 A    1/2017
CN      208234679 U    12/2018
(Continued)

OTHER PUBLICATIONS

International Search Report dated Nov. 22, 2021 issued in PCT Application No. PCT/KR2021/010598.
(Continued)

*Primary Examiner* — Lori L Baker
(74) *Attorney, Agent, or Firm* — STAAS & HALSEY LLP

(57) ABSTRACT

A water discharge unit of a water purifier includes a body having a neck that is coupleable to a sink and/or workbench, a head longitudinally extending from the neck and having a water discharge opening at a lower side of a distal end of the head, at least one pipe extending through the neck and the head through which water provided by a water purifier body is flowable to be discharged through the water discharge opening, a water discharge valve inside the body to regulate water flowing through the at least one pipe, a water discharge mechanism coupled to an upper side of a proximal end of the head to control the water discharge valve, and a touch panel coupled to the upper side of the head and spaced apart from the water discharge mechanism, and configured to receive a touch input for controlling the water purifier body.

18 Claims, 11 Drawing Sheets

(58) Field of Classification Search
CPC .............. E03C 2201/40; C02F 1/003; C02F 2201/005; C02F 2307/06; B67D 1/0085; B67D 1/0888; B67D 1/1202; B67D 2210/0001
USPC ............ 4/623, 619, 302, 313, 668; 137/562; 239/15, 569
See application file for complete search history.

(56) References Cited

U.S. PATENT DOCUMENTS

| | | | | |
|---|---|---|---|---|
| 11,008,224 | B2* | 5/2021 | Williams | ............... C02F 1/002 |
| 11,279,610 | B2 | 3/2022 | Jeon et al. | |
| 2013/0106097 | A1* | 5/2013 | Kim | ..................... C02F 9/20 |
| | | | | 285/119 |
| 2015/0344285 | A1 | 12/2015 | Joseph | |

FOREIGN PATENT DOCUMENTS

| | | | | |
|---|---|---|---|---|
| CN | 110486499 | A | 11/2019 | |
| CN | 210920264 | U | 7/2020 | |
| EP | 3699367 | A1 * | 8/2020 | ............... B05B 1/30 |
| JP | 7-268919 | | 10/1995 | |
| JP | 2001-220784 | | 8/2001 | |
| JP | 2004-293207 | | 10/2004 | |
| JP | 2006-16799 | | 1/2006 | |
| JP | 4360092 | | 11/2009 | |
| JP | 2010-84796 | | 4/2010 | |
| JP | 4594045 | | 12/2010 | |
| JP | 2016-142342 | | 8/2016 | |
| KR | 10-1770481 | | 9/2017 | |
| KR | 10-2018-0045754 | | 5/2018 | |
| KR | 10-2018-0063657 | | 6/2018 | |
| KR | 10-2063223 | | 1/2020 | |
| KR | 10-2020-0102800 | | 9/2020 | |
| WO | WO 2019/172531 | A1 | 9/2019 | |
| WO | WO-2024039722 | A1 * | 2/2024 | ........... B67D 1/0014 |

OTHER PUBLICATIONS

Written Opinion Report dated Nov. 22, 2021 issued in PCT Application No. PCT/KR2021/010598.
Supplementary European Search Report dated Oct. 9, 2023 issued in European Application No. EP 21 87 7824.

* cited by examiner

WATER DISCHARGE UNIT AND WATER PURIFIER INCLUDING SAME

CROSS REFERENCE TO RELATED APPLICATIONS

This application is a continuation of International Application PCT/KR2021/010598, filed Aug. 10, 2021, and claims foreign priority to Korean application 10-2020-0130515, filed Oct. 8, 2020, the disclosures of which are incorporated herein by reference in their entireties.

BACKGROUND

1. Field

The present disclosure relates to a water discharge unit and a water purifier including the same, and more particularly, to a water purifier including a water discharge mechanism.

2. Description of Related Art

A water purifier is an apparatus for providing a user with drinking water by removing harmful materials included in raw water, such as tap water or ground water, through various water purifying methods including precipitation, filtration, sterilization, etc. The water purifier supplies clean water to a user by filtering received water through one or more water purifying filters.

Water purifiers are classified into a direct-coupled type that is connected directly to a faucet, and a storage type that stores water in a container and causes the water to pass through a filter, according to types, and according to water purifying principles or methods, water purifiers are classified into a natural filtration type, a direct-coupled filtration type, an ion exchange resin type, a distillation type, a reverse osmotic pressure type, etc.

The direct-coupled filtration type is a type of connecting a water purifier directly to a water pipe to filter out impurities by passing water through a filter by water pressure. Purified water is discharged through a faucet and used as drinking water. The faucet is also called a water discharge unit.

In such a direct-coupled filtration type water purifier, a main body in which a filter is installed is positioned in a lower space of a sink, and a faucet is provided on the sink. This type of water purifier is called an under sink water purifier.

In the under sink water purifier, a controller may be provided at the faucet that a user easily accesses. However, the controller may be contaminated by external water, or due to an unintended operation of the controller by a user's mistake, water may be discharged from the faucet. Particularly, in the case in which hot water is discharged unintendedly, there may be a danger of burns.

SUMMARY

According to an embodiment of the disclosure, a water purifier may include a water purifier body; and a water discharge unit including a body including a neck that is coupleable to a sink and/or workbench, and a head longitudinally extending from the neck and having a water discharge opening at a lower side of a distal end of the head, at least one pipe extending through the neck and the head, through which water provided by the water purifier body is flowable to be discharged through the water discharge opening, a water discharge valve inside the body and configured to regulate water flowing through the at least one pipe, a water discharge mechanism coupled to an upper side of a proximal end of the head, and configured to be operated by a user to control the water discharge valve, and a touch panel coupled to the upper side of the head and spaced apart from the water discharge mechanism, and configured to receive a touch input for controlling the water purifier body.

According to an embodiment of the disclosure, the water discharge mechanism may be configured so that: the water discharge mechanism is operable by the user while no water is being discharged through the water discharge opening, to cause water to be discharged through the water discharge opening, and the water discharge mechanism is operable by the user while water is being discharged through the water discharge opening to cause no water to be discharged through the water discharge opening.

According to an embodiment of the disclosure, the water discharge mechanism may include a switch configured to control the water discharge valve, and an operating lever rotatably coupled to the head and configured to operate the switch.

According to an embodiment of the disclosure, the operating lever may be configured so that, upon pressing of an end of the operating lever in one direction by the user, the operating lever presses the switch to operate the switch.

According to an embodiment of the disclosure, the neck may have first and second ends, the first end may be coupleable to the sink and/or workbench, and, when the first end is coupled to the sink and/or workbench, the neck longitudinally extends upward. The head may longitudinally extends from the second end of the neck.

According to an embodiment of the disclosure, the touch panel may be at least partially positioned at the distal end of the head.

According to an embodiment of the disclosure, the switch may be below the operating lever.

According to an embodiment of the disclosure, the touch panel may extend from the distal end of the head toward the proximal end of the head.

According to an embodiment of the disclosure, the water discharge unit may include a drain hole configured to prevent the switch from being contaminated by water from the water discharge unit.

According to an embodiment of the disclosure, the drain hole may be between the touch panel and the switch.

According to an embodiment of the disclosure, the water discharge unit may include a guide panel forming the drain hole and including a guide surface guiding water to the drain hole, and the guide panel is between the touch panel and the switch.

According to an embodiment of the disclosure, at least one portion of the guide panel may be below the operating lever.

According to an embodiment of the disclosure, the water discharge unit may include a stopper supporting the operating lever and limiting a rotation range of the operating lever.

According to an embodiment of the disclosure, the operating lever may include a cover, and a coupling plate detachably coupled to a lower end of the cover and rotatably coupled to the head, and the stopper penetrates the coupling plate.

According to an embodiment of the disclosure, the touch panel may be configured to receive at least one of a touch input for selecting purified water, a touch input for selecting cold water, a touch input for selecting hot water, and a touch input for selecting an amount of water to be discharged.

According to an embodiment of the disclosure, a water discharge unit for an under sink water purifier includes: a neck which extends upward and of which a lower end is coupled to a sink; a head connected to the neck and extending in one direction; a water discharge opening positioned at a lower portion of one side of the head, wherein water is discharged through the water discharge opening; a touch panel positioned above the water discharge opening and configured to receive a touch input for selecting purified water, cold water, or hot water or a touch input for selecting an amount of water to be discharged; and an operating lever configured to control discharging of water and positioned at an upper portion of the other side of the head while being spaced from the water discharge opening and the touch panel.

According to an embodiment of the disclosure, the water discharge unit may further include a pipe configured to supply water to the water discharge opening and a water discharge valve configured to selectively supply water to inside of the pipe, and according to an operation of the operating lever, an operation of the water discharge valve may be controlled.

According to an embodiment of the disclosure, the water discharge unit may further include a switch positioned below the operating lever and configured to control the water supply valve, and the operating lever may press the switch to operate the switch.

According to an embodiment of the disclosure, the water discharge unit may further include a guide panel coupled to an upper end of the head, positioned between the touch panel and the switch, and including a guide surface guiding external water of the head to inside of the head.

According to an embodiment of the disclosure, a water purifier includes: a water purifier body; and a water discharge unit connected to the water purifier body, wherein the water discharge unit includes: a body providing a water discharge flow path therein, the body including a neck extending in one direction and a head extending in another direction from the neck; a water discharge opening positioned at one side of the head, wherein water flowing through the water discharge flow path is discharged through the water discharge opening; a water discharge valve configured to open or close the water discharge flow path; an inputter positioned at one side of the head and configured to receive an input for selecting purified water, cold water, or hot water or an input for selecting an amount of water to be discharged and transmit an input signal to the water purifier body; and a water discharge mechanism configured to control the water discharge valve and coupled to the body while being spaced from the water discharge opening and the inputter.

BRIEF DESCRIPTION OF THE DRAWINGS

Aspects, features, and advantages of certain embodiments of the present disclosure will be more apparent from the following description taken in conjunction with the accompanying drawings, in which.

DETAILED DESCRIPTION

Figure 1:
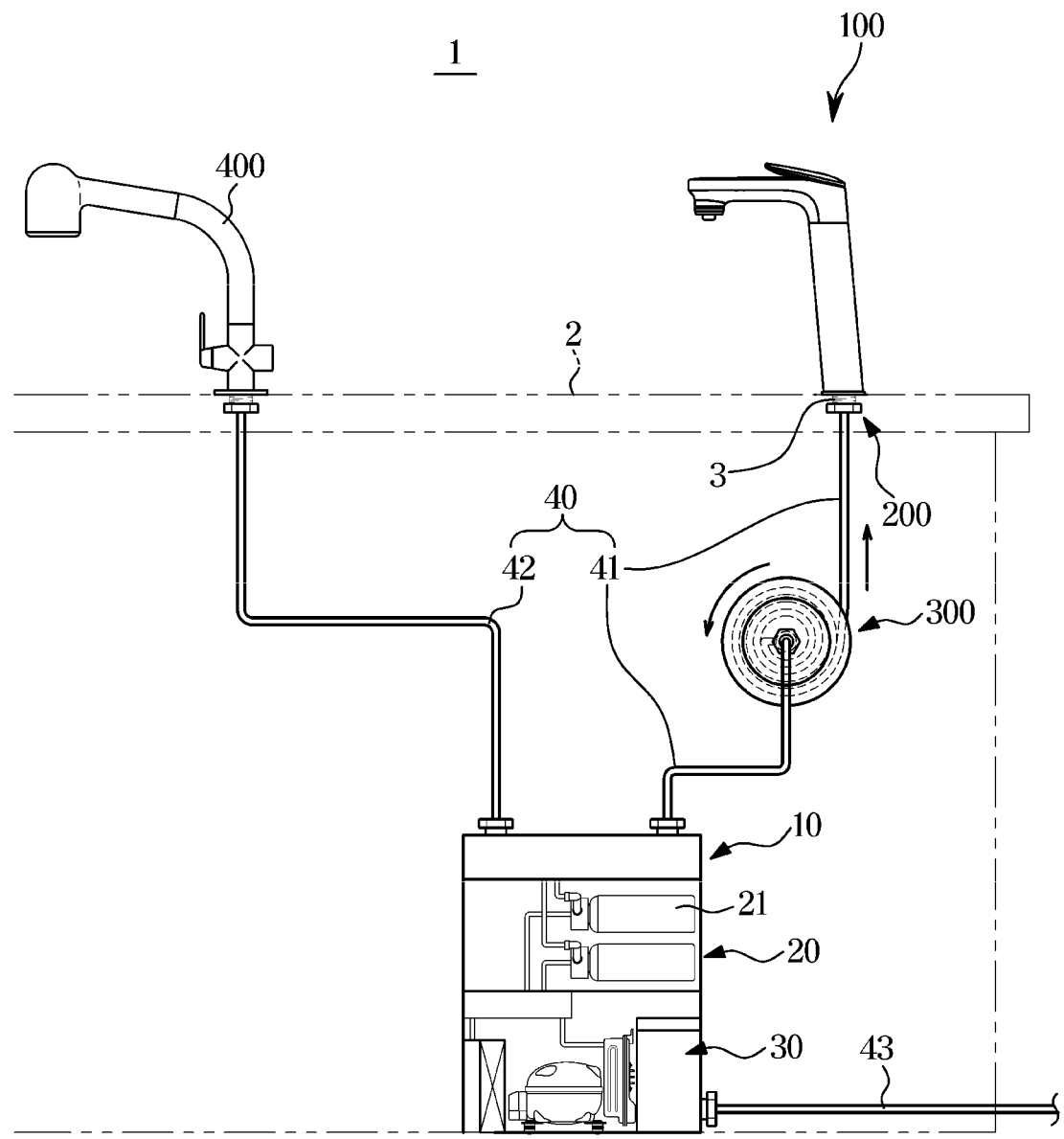
FIG. 1 schematically shows a water purifier according to an embodiment of the disclosure.

Configurations illustrated in the drawings and the embodiments described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "upper", "lower", "front end", and "rear end" are defined based on the drawings, and the shapes and positions of the components are not limited by the terms.

Terminology such as "at least one of A and B", as used herein, includes any of the following: A, B, A and B. Terminology such as "at least one of A, B, and C", as used herein, includes any of the following: A, B, C, A and B, A and C, B and C, A and B and C.

An embodiment of the disclosure provides a water purifier capable of preventing water from being discharged by an unintended operation of a water discharge unit.

Moreover, an embodiment of the disclosure provides a water purifier including a water discharge unit that is intuitively controllable.

In addition, an embodiment of the disclosure provides a water purifier including a water discharge unit that is prevented from breaking down by external water.

Further, according to an embodiment of the disclosure, because the water discharge unit includes the water discharge mechanism spaced from the touch panel and the water discharge opening that are easily contaminated by a user's access and external water, a case in which the water discharge unit discharges water unintendedly may be prevented.

Also, according to an embodiment of the disclosure, a user may intuitively and easily turn on/off water by using the water discharge mechanism.

Also, according to an embodiment of the disclosure, because the drain hole is provided in the water discharge unit, the water discharge mechanism may be prevented from being contaminated or breaking down by external water.

Figure 2:
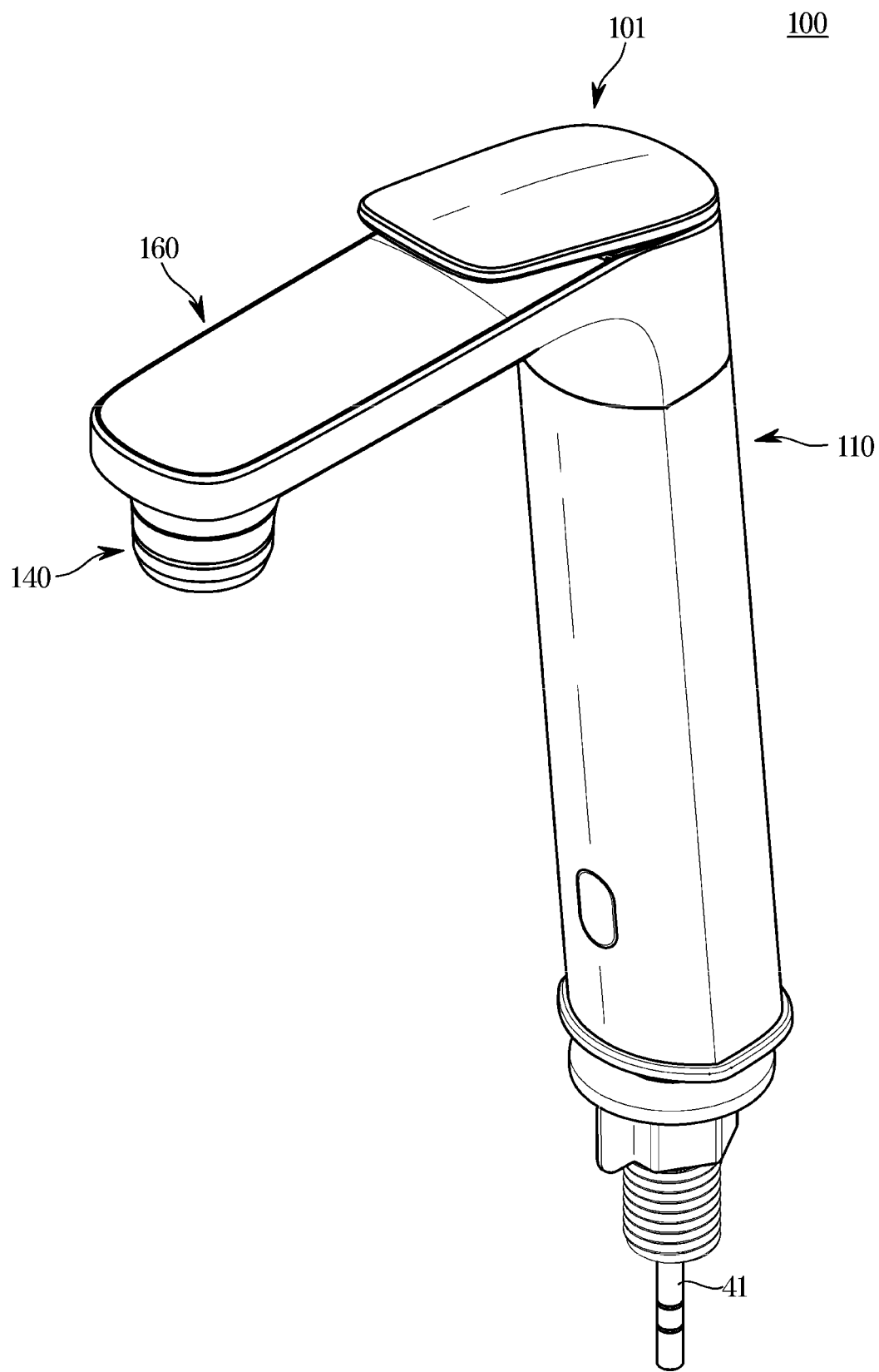
FIG. 2 is a perspective view of a water discharge unit shown in FIG. 1.

FIG. 1 schematically shows a water purifier according to an embodiment of the disclosure. FIG. 2 is a perspective view of a water discharge unit shown in FIG. 1.

Referring to FIGS. 1 and 2, a water purifier 1 may include a water purifier body 10, and a water discharge unit 100 connected to the water purifier body 10 to discharge purified water to outside of the water purifier body 10. The water purifier body 10 may be positioned below a kitchen workbench 2, and the water discharge unit 100 may be positioned on the kitchen workbench 2. The kitchen workbench 2 may include a sink. The water discharge unit 100 may be referred to as a faucet.

The water discharge unit 100 may be mounted on the kitchen workbench 2. The water discharge unit 100 may be mounted on a sink. The water discharge unit 100 may be rotatably mounted on the kitchen workbench 2. The water discharge unit 100 may be connected to the water purifier body 10 through a connecting member 40.

The water purifier body 10 may be positioned inside the kitchen workbench 2. The water purifier body 10 may include a filter unit 20 including at least one filter 21, and a heat exchange unit 30 for cooling or heating water purified by the filter unit 20. The heat exchange unit 30 may include a heater and a cooling cycle device including a compressor, a condenser, an expansion valve, and an evaporator, although not shown.

The water purifier body 10 may receive raw water such as tap water through an external tube 43.

The connecting member 40 connected to the water purifier body 10 may include a first tube 41 connected to the water discharge unit 100, and a second tube 42 connected to a faucet mounted on the kitchen workbench 2. The first tube 41 may include a plurality of first tubes 41.

In the kitchen workbench 2, an installing portion 3 for installing the water discharge unit 100 may be provided. The installing portion 3 may be formed by opening at least one portion of the kitchen workbench 2. The water discharge unit 100 may be connected to the first tube 41 through the installing portion 3 of the kitchen workbench 2.

The water discharge unit 100 may be rotatably installed in the installing portion 3. The water purifier 1 may include a rotating device 200 for rotatably installing the water discharge unit 100 in the installing portion 3. The rotating device 200 may be coupled to the kitchen workbench 2.

The water purifier 1 may include a tube fixing device 300 for fixing the tube 40. The tube fixing device 300 may be installed to adjust a length of the tube 40. The tube fixing device 300 may be installed inside the kitchen workbench 2. The tube fixing device 300 may be positioned between the water purifier body 10 and the water discharge unit 100. The tube fixing device 300 may be installed in at least any one of the water purifier body 10 or the kitchen workbench 2.

Figure 3:
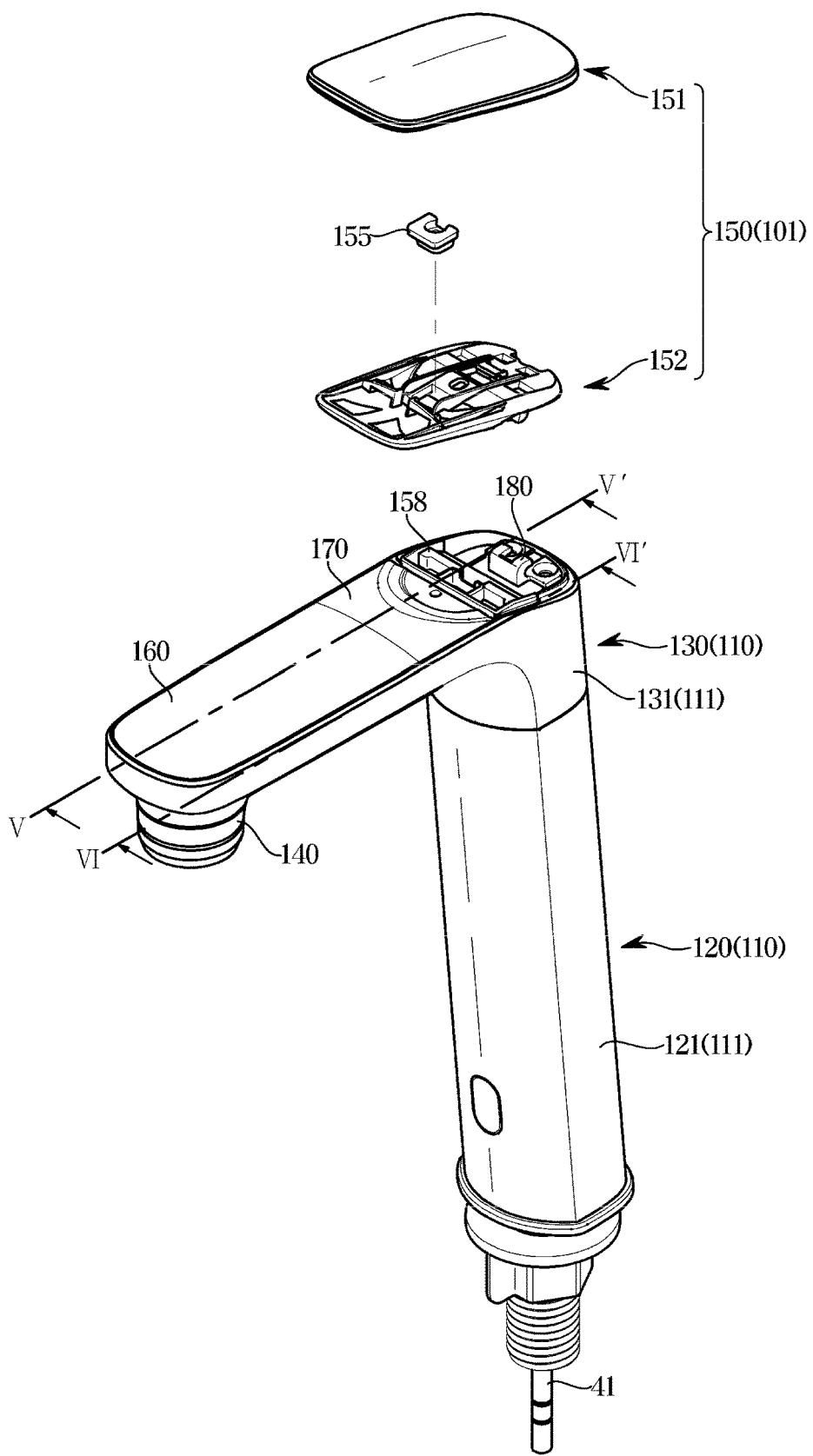
FIG. 3 is an exploded view of a water discharge mechanism in the water discharge unit shown in FIG. 2.
Figure 4:
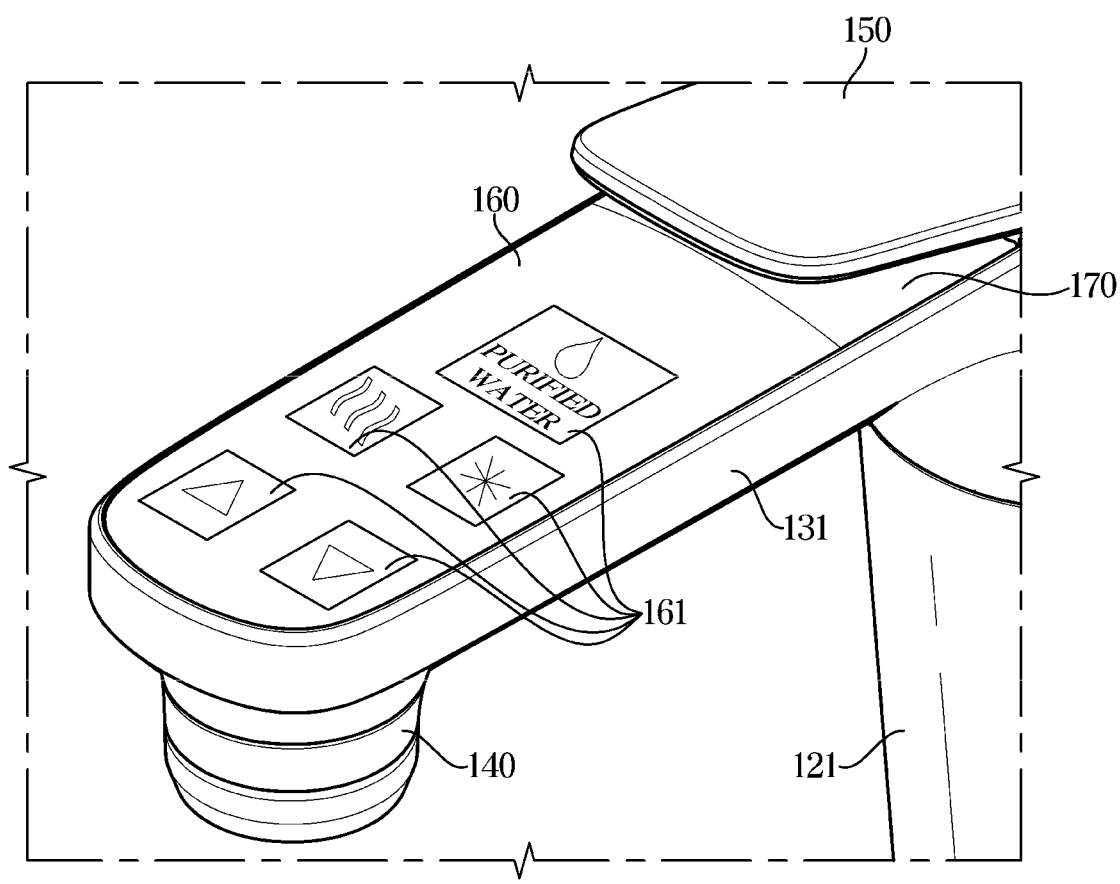
FIG. 4 shows an example of image buttons output on a touch panel of the water discharge unit shown in FIG. 2.
Figure 5:
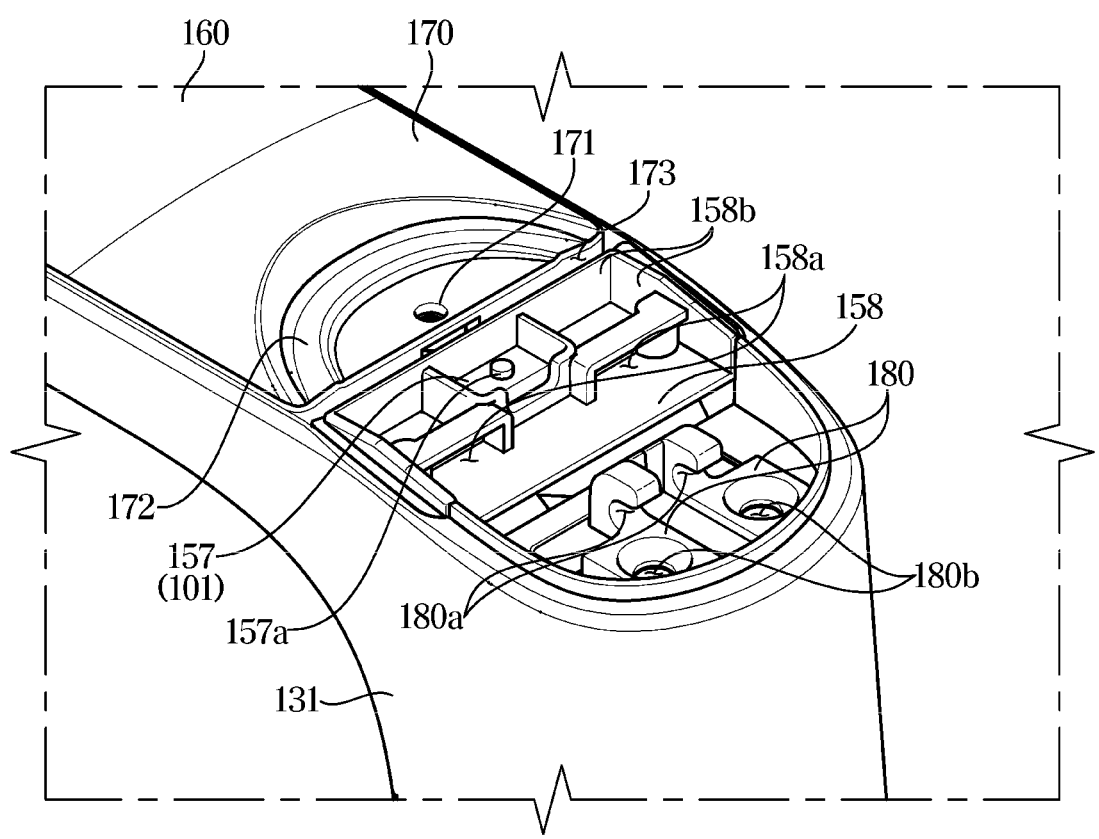
FIG. 5 shows the water discharge unit shown in FIG. 3, from which a water discharge mechanism is omitted.
Figure 6:
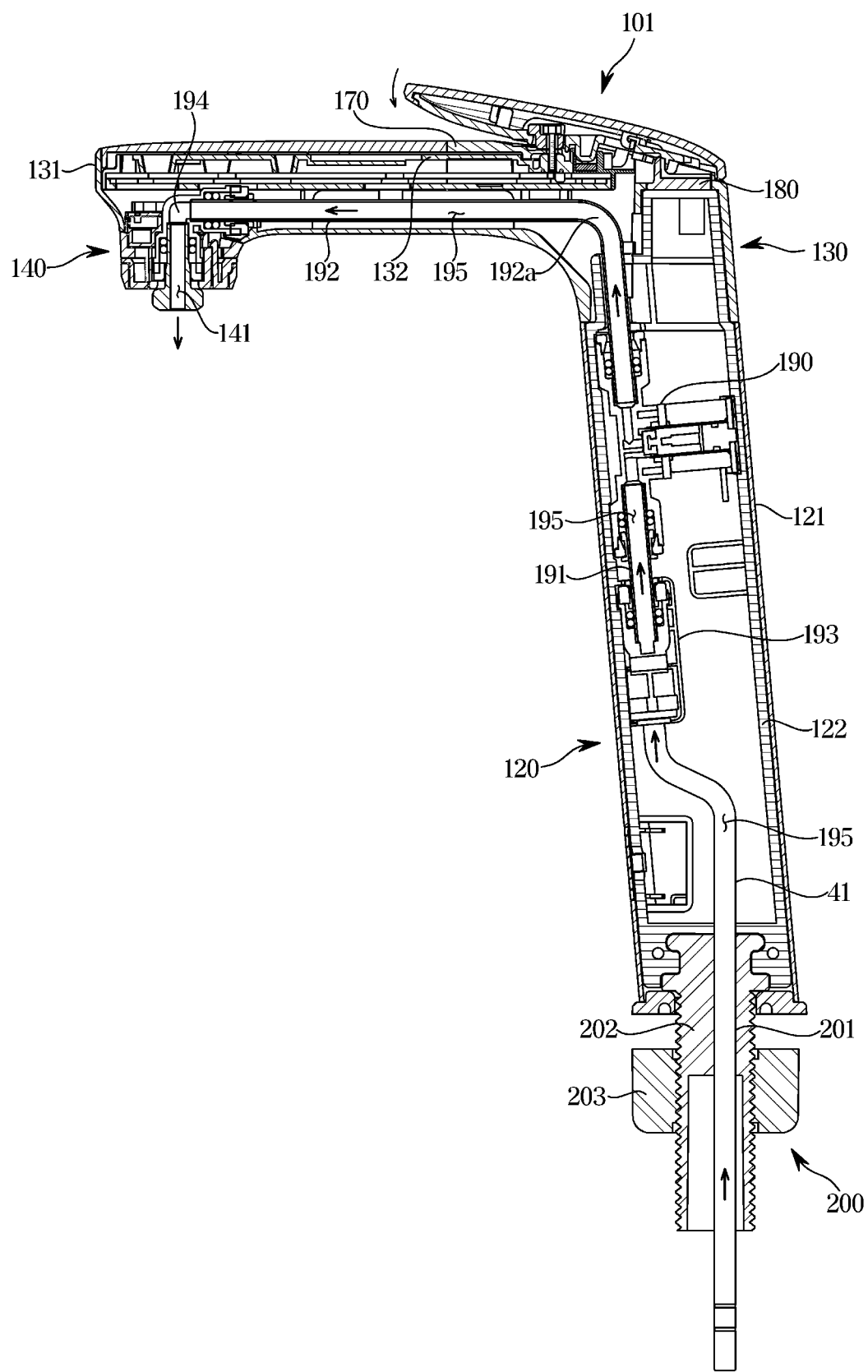
FIG. 6 is a cross-sectional view showing a cross section taken along an indication line V-V' shown in FIG. 3.
Figure 7:
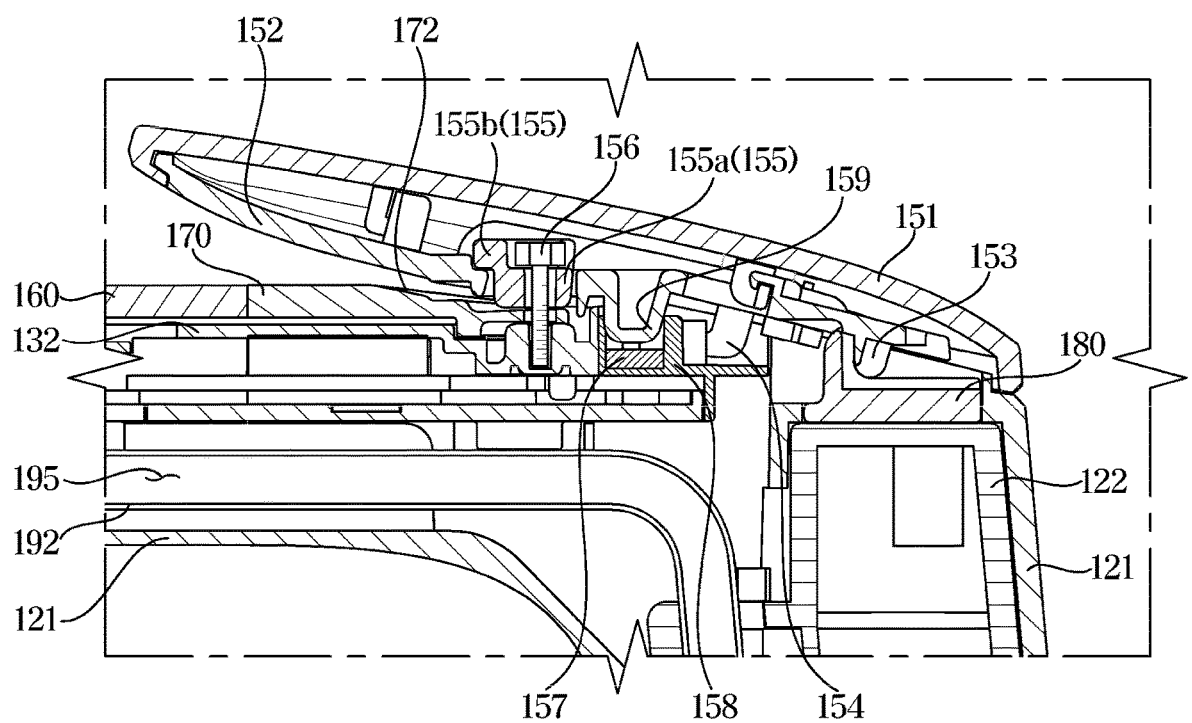
FIG. 7 is an enlarged view showing a portion of the water discharge mechanism in the cross-sectional view shown in FIG. 6.
Figure 8:
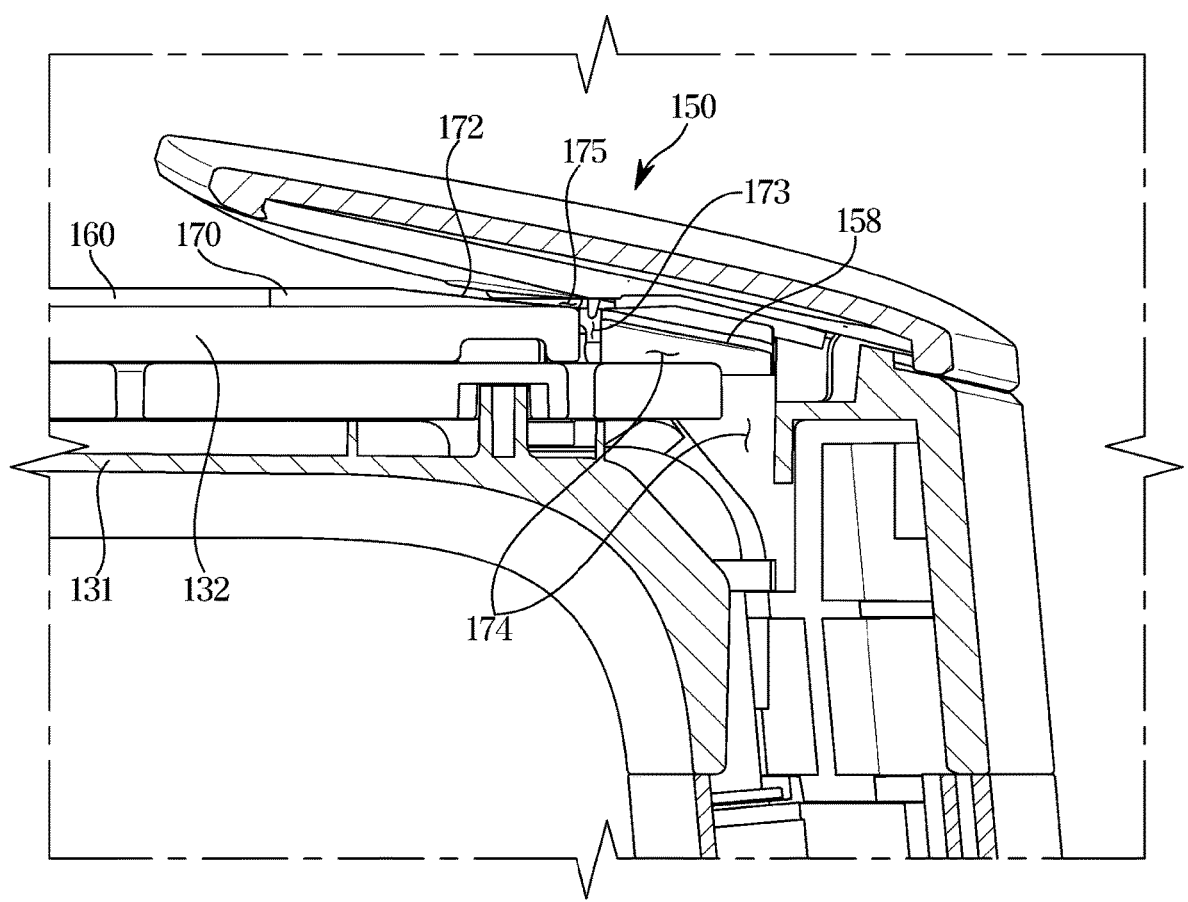
FIG. 8 is a cross-sectional view showing a cross section taken along an indication line VI-VI' shown in FIG. 3.

FIG. 3 is an exploded view of a water discharge mechanism in the water discharge unit shown in FIG. 2. FIG. 4 shows an example of image buttons output on a touch panel of the water discharge unit shown in FIG. 2. FIG. 5 shows the water discharge unit shown in FIG. 3, from which a water discharge mechanism is omitted. FIG. 6 is a cross-sectional view showing a cross section taken along an indication line V-V' shown in FIG. 3. FIG. 7 is an enlarged view showing a portion of the water discharge mechanism in the cross-sectional view shown in FIG. 6. FIG. 8 is a cross-sectional view showing a cross section taken along an indication line VI-VI' shown in FIG. 3.

Hereinafter, a structure of the water discharge unit 100 will be described in detail with reference to FIGS. 3 to 8.

The water discharge unit 100 may include a body 110 which forms an outer appearance and in which various components are installed. One side of the body 110 may be rotatably coupled to the kitchen workbench 2. More specifically, the body 110 may include a neck 120 extending substantially upward, and a head 130 extending substantially horizontally from an upper end of the neck 120, wherein a lower end of the neck 120 may be rotatably coupled to the kitchen workbench 2 by the rotating device 200. A length in up-down direction of the neck 120 may change, and accordingly, a height of the water discharge unit 100 may be adjustable.

The body 110 may include a case 111 forming an outer appearance of the water discharge unit 100. The case 111 may include a lower case 121 and an upper case 131.

The neck 120 may include the lower case 121 forming an outer appearance of the neck 120 and being substantially in a shape of a cylinder extending in the up-down direction, and a first inner frame 122 positioned inside the lower case 121 and extending in the direction in which the lower case 121 extends, wherein one end of the first inner frame 122 may protrude upward from the lower case 121 and the first inner frame 122 may be substantially in a shape of a hollow cylinder.

The head 130 may include the upper case 131 forming an outer appearance of the head 130 and having one end coupled to the neck 120, and a second inner frame 132 fixed inside the upper case 131 and supporting various electronic components, such as a touch panel 160 and a printed circuit board. The upper case 131 may be coupled to one end of the first inner frame 122, protruding upward from the lower case 121. The second inner frame 132 may be formed substantially in a shape of a plate, and extend from the other end of the head 130, the other end being an opposite side of the one end of the head 130 connected to the neck 120, toward the one end of the head 130.

The lower case 121 may be perpendicular to or inclined with respect to one surface of the kitchen workbench 2 in which the installing portion 3 is formed. The upper case 131 may be bent from an upper end of the lower case 121 and extend substantially horizontally. Referring to FIG. 3, the upper case 131 may extend in a front-rear direction. The lower case 121 and the upper case 131 may be separate components or integrated into one body. In other words, the neck 120 and the head 130 may be provided separately and then coupled to each other, or may be integrated into one body.

The water discharge unit 100 may include a water discharge portion 140 positioned at one side of the body 110 and discharging water. More specifically, the water discharge portion 140 may be positioned at the other end of the head 130, the other end being an opposite side of the one end of the head 130 connected to the neck 120. The water discharge portion 140 may be positioned at a lower portion of the other end of the head 130. Referring to FIG. 3, the water discharge portion 140 may be positioned at a lower portion of a front end of the head 130. The water discharge portion 140 may be positioned at a lower portion of the upper case 131. The water discharge portion 140 may include a water discharge opening 141 through which water is discharged to outside of the water discharge unit 100. The water discharge portion 140 may be manufactured as a separate component and then detachably coupled to the head 130, or may be integrated into the head 130. As can be seen in the figures, the water discharge opening 141 is at a lower side of a distal end of the head 130

The water discharge unit 100 may include at least one pipe 191 and 192 positioned inside the body 110. Water supplied from the water purifier body 10 may flow through the pipe 191 and 192. The pipe 191 and 192 may form a water discharge flow path 195 along which water supplied from the water purifier body 10 flows. The pipe 192 may be connected to the water discharge portion 140. The pipe 192 may communicate with the water discharge opening 141. Water flowing through the pipe 191 and 192 may be discharged to the outside of the water discharge unit 100 through the water discharge opening 141.

The water discharge unit 100 may include a water discharge valve 190 for turning on or off water. That is, the water discharge valve 190 may control discharging of water through the water discharge opening 141. The water discharge valve 190 may be positioned on the water discharge flow path 195. The water discharge valve 190 may regulate water flowing through the pipe 191 and 192. That is, the water discharge valve 190 may open and close the water discharge flow path 195. In other words, the water discharge valve 190 may selectively supply water to the pipe 191 and 192.

The water discharge valve 190 may be positioned inside the body 110. The water discharge valve 190 may be positioned inside the lower case 121.

Both sides of the water discharge valve 190 may be connected to a first pipe 191 and a second pipe 192.

The water discharge unit 100 may include a connector 193 connecting the first tube 41 with the first pipe 191, one end of the first pipe 191 may be connected to the first tube 41 by the connector 193, and the other end of the first pipe 191 may be connected to the water discharge valve 190.

One end of the second pipe 192 may be connected to the water discharge valve 190, and the other end of the second pipe 192 may communicate with the water discharge opening 141. The second pipe 192 may be connected to the water discharge opening 141 by an elbow pipe 194. One side of the second pipe 192 may be positioned inside the neck 120, the other side of the second pipe 192 may be positioned inside the head 130, and the second pipe 192 may include a bent portion 192a bent to correspond to a portion at which the neck 120 is connected to the head 130. The water discharge valve 190 may be positioned between the first pipe 191 and the second pipe 192. The water discharge valve 190 may regulate discharging of water flowing through the first pipe 191 to the second pipe 192.

The water discharge unit 100 may include the touch panel 160 for receiving a touch input. The touch panel 160 may be referred to as an inputter. The touch panel 160 may form an upper surface of the water discharge unit 100. More specifically, because the upper case 131 opens upward, the head 130 may open upward, and the touch panel 160 may be coupled to an open upper end of the head 130 to cover an inside space of the head 130. The touch panel 160 may cover various electronic components including a printed circuit board installed in the inside space of the head 130.

The touch panel 160 may be positioned above the water discharge portion 140. The touch panel 160 may be positioned at the other end of the head 130, the other end being an opposite side of the one end of the head 130 connected to the neck 120. The touch panel 160 may extend from the other end of the head 130 toward the one end of the head 130 by a preset length.

The touch panel 160 may be electrically connected to the water purifier body 10 by a wire, or may be connected wirelessly with the water purifier body 10. The touch panel 160 may receive a touch input for selecting purified water, cold water, or hot water and/or a touch input for selecting an amount of water to be discharged from the water discharge portion 140, and transmit an input signal corresponding to a received touch input to the water purifier body 10. The water purifier body 10 which has received the input signal from the touch panel 160 may supply one of purified water, cold water, or hot water to the water discharge unit 100 according to the input signal, or adjust an amount of water to be supplied to the water discharge unit 100 according to the input signal.

For example, selecting an amount of water to be discharged may be selecting one of 120 ml, 500 ml, 1000 ml, or continuous discharging. The continuous discharging may be a state of continuously discharging water until a user turns off water by operating the water discharge mechanism.

Meanwhile, purified water may be water resulting from filtering raw water by the filter 21 without cooling or heating and supplied to the water discharge unit 100, cold water may be water resulting from filtering raw water by the filter 21 and cooling the filtered water by the heat exchange unit 30 and supplied to the water discharge unit 100, and hot water may be water resulting from filtering raw water by the filter 21 and heating the filtered water by the heat exchange unit 30 and supplied to the water discharge unit 100. That is, purified water, cold water, and hot water may correspond to water having different temperatures.

The touch panel 160 may output an image button 161 to enable a user to make an input for selecting purified water, cold water, or hot water or an input for selecting an amount of water to be discharged. The user may operate the water purifier body 10 by touching an area of the touch panel 160 showing the image button 161.

The water discharge unit 100 may include a water discharge mechanism 101 for controlling the water discharge valve 190. That is, the water discharge mechanism 101 may control discharging of water through the water discharge opening 141 by controlling the water discharge valve 190.

The water discharge mechanism 101 may be positioned in the body 110 while being spaced from the water discharge portion 140 and the touch panel 160. More specifically, the water discharge mechanism 101 may be positioned above the one end of the head 130 connected to the neck 120. Referring to FIG. 2, the water discharge mechanism 101 may be positioned above a rear end of the head 130. For example, as shown in FIG. 2, the water discharge mechanism 101 is coupled to an upper side of a proximal end of the head 130.

The water discharge mechanism 101 may include a switch 157 electrically connected to the water discharge valve 190, and an operating lever 150 for operating the switch 157.

The operating lever 150 may include a cover 151 forming an outer appearance, and a coupling plate 152 positioned below the cover 151 and detachably coupled to the body 110. The coupling plate 152 may be detachably coupled to a lower end of the cover 151.

The operating lever 150 may be coupled to the upper end of the head 130. One side of the operating lever 150 may be rotatably coupled to the upper end of the head 130. The one side of the operating lever 150 may be detachably coupled to the upper end of the head 130.

More specifically, the head 130 may include a coupling frame 180. The coupling frame 180 may be positioned in an upper end of one side of the upper case 131 coupled to the neck 120, and fixed to the first inner frame 122. The coupling plate 152 may be rotatably coupled to the coupling frame 180. More specifically, the coupling frame 180 may include a coupling groove 180a, and the operating lever 150 may include a rotating shaft 153 protruding downward from the coupling plate 152 and extending in a left-right direction of FIG. 3 to correspond to the coupling groove 180a. By inserting the rotating shaft 153 into the coupling groove 180a, the coupling plate 152 may be coupled to the coupling frame 180 in such a way as to be rotatable with respect to the rotating shaft 153. The coupling frame 180 may include a fixing hole 180b which a coupling member (not shown) for fixing the coupling frame 180 to the first inner frame 122 penetrates. The coupling member may include a positioning member, such as a screw, a pin, etc.

The operating lever 150 may include an operating protrusion 159 for operating the switch 157. The operating protrusion 159 may protrude from the coupling plate 152. The operating protrusion 159 may protrude downward from the coupling plate 152. While the operating lever 150 is pressed downward and rotates, the operating protrusion 159 may press the switch 157 to operate the switch 157. More specifically, the operating protrusion 159 may press a button 157a of the switch 157 to operate the switch 157.

After pressure applied to the operating lever 150 pressed and rotated disappears, the operating lever 150 may return to an original position. In a case in which no pressure is applied to the operating lever 150, a position of the operating lever 150 while water is discharged from the water discharge unit may be identical to a position of the operating lever 150 while no water is discharged from the water discharge unit, although not limited thereto. While no water is discharged from the water discharge unit 100, the operating lever 150 may be located at a first position, and while water is discharged from the water discharge unit 100, the operating lever 150 may be located at a second position that is different from the first position.

The operating lever 150 may be pressed upward by a restoring force of an elastic member (not shown) provided inside the switch 157. Upon downward pressing of the operating lever 150, the elastic member provided in the switch 157 may be elastically deformed by the button 157a pressed by the operating protrusion 159, and after pressure applied to the operating lever 150 disappears, the operating lever 150 may be pushed upward together with the button 157a by a restoring force of the elastic member provided in the switch 157, and the operating lever 150 may rotate upward with respect to the rotating shaft 153. The elastic member provided in the switch 157 may be a coil spring, a leaf spring, etc. By using the restoring force of the elastic member, the operating lever 150 may return to the original position upon disappearing of pressure applied to the operating lever 150 after the operating lever 150 is pressed and rotated by a user, although not limited thereto.

An elastic member (not shown) such as a spring may be positioned between the head 130 and the operating lever 150 or at the rotating shaft 153 of the operating lever 150, separately from the elastic member provided in the switch 157. For example, the water discharge mechanism 101 may include a compression spring of which one end is coupled to the upper housing 131 or the switch case 158 and the other end is coupled to the coupling plate 152 and/or a torsion spring coupled to the rotating shaft 153 of the operating lever 150. The elastic member may be elastically deformed while the operating lever 150 is pressed downward by a user, and upon disappearing of pressure applied to the operating lever 150, the elastic member may rotate the operating lever 150 upward.

The water discharge unit 100 may include a stopper 155 for limiting a rotation range of the operating lever 150. The stopper 155 may limit a range to which the operating lever 150 rotates upward, and support the operating lever 150 to prevent the operating lever 150 from being separated from the head 130. The stopper 155 may be detachably fixed to the upper end of the head 130. More specifically, the stopper 155 may be fixed to a guide panel 170 and the second inner frame 132 by a coupling member 156 penetrating the stopper 155 and the guide panel 170 and coupled to the second inner frame 132. The coupling member 156 may include a positioning member including a screw, a pin, etc.

The stopper 155 may include a body portion 155a fixed to the guide panel 170 and the second inner frame 132, and a protrusion portion 155b protruding horizontally from an upper end. The body portion 155a may penetrate the coupling plate 152, and in a state in which the body portion 155a penetrates the coupling plate 152, the protrusion portion 155b may support an upper surface of the coupling plate 152.

The switch 157 may be positioned on the upper end of the head 130. The switch 157 may be positioned at a location corresponding to the operating protrusion 159 of the operating lever 150. The switch 157 may be positioned below the operating protrusion 159. More specifically, the water discharge unit 100 may include a switch case 158 positioned on an inner upper end of the upper case 131, positioned below the operating lever 150, and opening toward a front direction, and the switch 157 may be positioned inside the switch case 158. The switch 157 may include a tact switch.

The switch case 158 may include a support groove 158a which supports the operating lever 150 and in which a projection hook 154 of the operating lever 150 protruding from the coupling plate 152 is inserted to limit a rotation range of the operating lever 150. More specifically, an upward movement range of the projection hook 154 may be limited by the support groove 158a, and accordingly, an upward rotation range of the operating lever 150 may be limited.

Upon pressing of the button 157a of the switch 157 by the operating protrusion 159, the switch 157 may control the water discharge valve 190. More specifically, in a case in which the button 157a of the switch 157 is pressed according to an operation of the operating lever 150 while water is discharged through the water discharge opening 141 because the water discharge valve 190 opens the water discharge flow path 195, the switch 157 may turn off the water discharge valve 190, the water discharge flow path 195 may be closed, and no water may be discharged through the water discharge opening 141, and in a case in which the button 157a of the switch 157 is pressed according to an operation of the operating lever 150 while no water is discharged through the water discharge opening 141 because the water discharge valve 190 closes the water discharge flow path 195, the switch 157 may turn on the water discharge valve 190, the water discharge flow path 195 may open, and water may be discharged through the water discharge opening 141.

The switch 157 pressed by the operating protrusion 159 may transmit a signal to a main controller 11 (see FIG. 9) provided in the water purifier body 10, and the main controller 11 which has received the signal generated by the switch 157 may control the water discharge valve 190. That is, the switch 157 may control the water discharge valve 190 by the main controller 11, although not limited thereto. However, the switch 157 may itself control the water discharge valve 190, or may control the water discharge valve 190 by an auxiliary controller (not shown) that may be provided in the water discharge unit 100.

Figure 9:
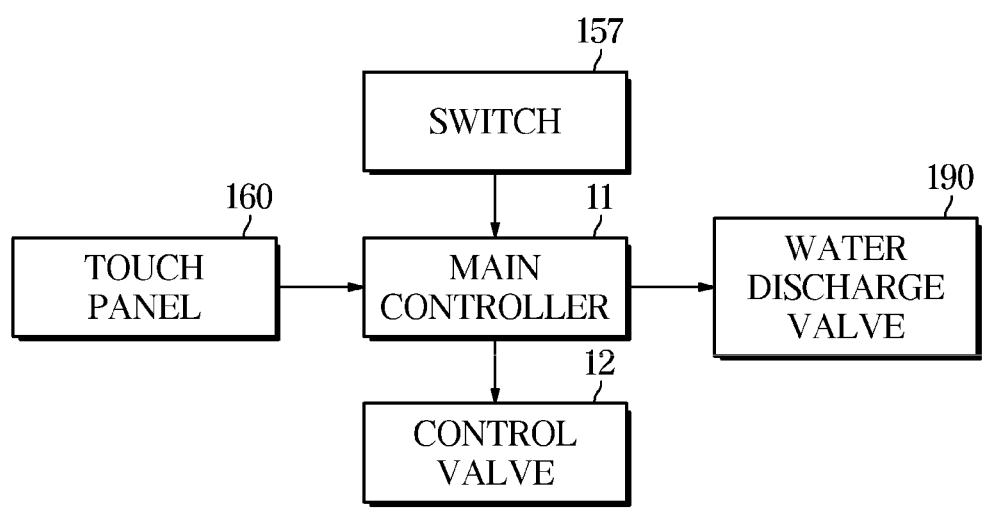
FIG. 9 is a control block diagram of the water purifier shown in FIG. 1.
Figure 10:
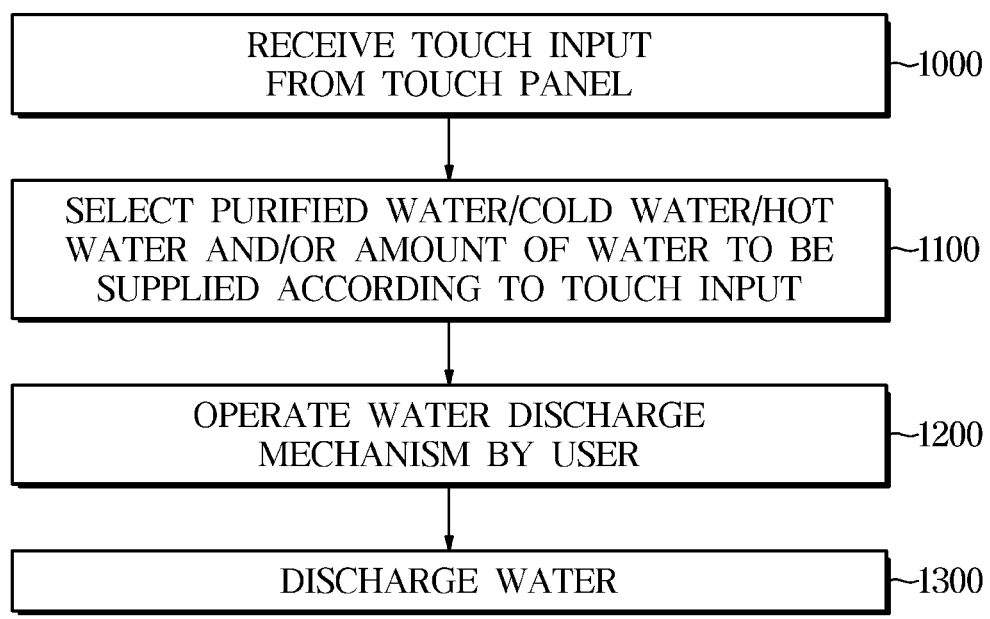
FIG. 10 is a flowchart of a method for controlling the water purifier shown in FIG. 1.

FIG. 9 is a control block diagram of the water purifier shown in FIG. 1. FIG. 10 is a flowchart of a method for controlling the water purifier shown in FIG. 1.

A process of discharging water in the water purifier 1 will be described with reference to FIGS. 9 and 10.

While no water is discharged from the water discharge unit 100, a user may operate the touch panel 160 by touching the touch panel 160 (1000). The user may operate the touch panel 160 to select water to be supplied from the water discharge unit 100 from among purified water, cold water, and hot water (1100).

The user may operate the touch panel 160 to select an amount of water to be supplied from the water discharge unit 100 (1100), although not limited thereto. However, the user may operate the touch panel 160 to select an amount of water to be discharged from the water discharge unit 100 per unit time.

The touch panel 160 which has received a touch input by the user may transmit an input signal corresponding to the touch input to the main controller 11 provided in the water purifier body 10. The main controller 11 may control a control valve 12 provided in the water purifier body 10 according to the input signal from the touch panel 160. The control valve 12 may include a plurality of control valves 12, and control whether to discharge purified water, cold water, or hot water to the outside of the water purifier body 10 or control an amount of water to be discharged to the outside of the water purifier body 10. Water discharged to the outside of the water purifier body 10 may flow along the tube 41.

The user may operate the touch panel 160 and then operate the water discharge mechanism 101 (1200). Upon an operation of the water discharge mechanism 101 by the user, the switch 157 may transmit the input signal to the main controller 11.

The main controller 11 which has received the input signal from the switch 157 may control the water discharge valve 190 to open the water discharge valve 190. Because the water discharge valve 190 opens, the water discharge flow path 195 may open, and water entered the water discharge unit 100 by flowing along the tube 41 from the water purifier body 10 may be discharged to the outside of the water discharge unit 100 through the water discharge opening 141 (1300). The user may receive a desired amount of water having his/her desired temperature from the water discharge unit 100.

In a case in which the user who has received water by this process again operates the water discharge mechanism 101, an input signal from the switch 157 may be transmitted to the main controller 11, and the main controller 11 which has received the input signal may control the water discharge valve 190 to turn off the water discharge valve 190. Upon the turning-off of the water discharge valve 190, the water discharge flow path 190 may be closed, and no water may be discharged through the water discharge opening 141.

Meanwhile, while water is discharged through the water discharge opening 141, the user may operate the touch panel 160. The user may operate the touch panel 160 to change a state in which any one of purified water, cold water, or hot water flows to a state in which another kind of water flows. Also, the user may operate the touch panel 160 to change a state of discharging water by a first amount of water to a state of discharging water by a second amount of water that is different from the first amount of water.

Meanwhile, the water discharge unit 100 may include an auxiliary controller, and the auxiliary controller may relay signal transmission/reception between the touch panel 160 and the main controller 11 and/or signal transmission/reception between the switch 157 and the main controller 11 and/or signal transmission/reception between the water discharge valve 190 and the main controller 11. The auxiliary controller may be positioned inside the water discharge unit 100. The auxiliary controller may be provided on a printed circuit board of the water discharge unit 100 or in the water discharge valve 190.

So far, a disclosure in which the water discharge mechanism 101 includes the switch 157 has been described, although the disclosure is not limited thereto. For example, the switch 157 may be replaced by a contact sensor or a pressure sensor. In this case, according to a downward rotation of the operating lever 150, the operating protrusion 159 may also rotate together and contact the contact sensor or the pressure sensor. The contact sensor or the pressure sensor may recognize the contact of the operating protrusion 159 and transmit a recognition signal generated according to the recognition to the main controller 11, and the main controller 11 may control opening or closing of the water discharge valve 190. After the operating lever 150 returns to the position before being pressed, by the elastic member, the operating protrusion 159 may be in non-contact with the contact sensor or the pressure sensor.

Accordingly, in a case in which the operating lever 150 operates and the contact sensor or the pressure sensor recognizes a contact of the operating protrusion 159 while water is discharged through the water discharge opening 141 because the water discharge valve 190 opens the water discharge flow path 195, the main controller 11 may turn off the water discharge valve 190, the water discharge flow path 195 may be closed, and no water may be discharged through the water discharge opening 141, and in a case in which the operating lever 150 operates and the contact sensor or the pressure sensor recognizes a contact of the operating protrusion 159 while no water is discharged through the water discharge opening 141 because the water discharge valve 190 closes the water discharge flow path 195, the main controller 11 may turn on the water discharge valve 190, the water discharge flow path 195 may open, and water may be discharged through the water discharge opening 141, although not limited thereto.

While the operating protrusion 159 is in contact with the contact sensor or the pressure sensor and the contact sensor or the pressure sensor recognizes the contact of the operating protrusion 159, the main controller 11 may turn on the water discharge valve 190, and while the operating protrusion 159 is in non-contact with the contact sensor or the pressure sensor, the main controller 11 may turn off the water discharge valve 190.

As another example, the switch 157 may be replaced by a hall sensor or a position sensor. The operating protrusion 159 may be detected by the hall sensor or the position sensor. In a case in which the switch 157 is replaced by a hall sensor, the operating protrusion 159 may include a magnet that is detectable by the hall sensor.

While the operating lever 150 does not rotate downward, the operating protrusion 159 may be not detected by the hall sensor or the position sensor, and while the operating lever 150 is pressed downward to rotate and the operating protrusion 159 approaches the hall sensor or the position sensor, the operating protrusion 159 may be detected by the hall sensor or the position sensor. After the hall sensor or the position sensor detects the operating protrusion 159, the hall sensor or the position sensor may transmit a detection signal to the main controller 11, and the main controller 11 may control opening or closing of the water discharge valve 190. After the operating lever 150 returns to the position before being pressed, by the elastic member, the operating protrusion 159 may be not detected by the hall sensor or the position sensor.

Accordingly, in a case in which the hall sensor or the position sensor detects the operating protrusion 159 according to an operation of the operating lever 150 while water is discharged through the water discharge opening 141 because the water discharge valve 190 opens the water discharge flow path 195, the main controller 11 may turn off the water discharge valve 190, the water discharge flow path 195 may be closed, and no water may be discharged through the water discharge opening 141. In a case in which the hall sensor or the position sensor detects the operating protrusion 159 according to an operation of the operating lever 150 while no water is discharged through the water discharge opening 141 because the water discharge valve 190 closes the water discharge flow path 195, the main controller 11 may turn on the water discharge valve 190, the water discharge flow path 195 may open, and water may be discharged through the water discharge opening 141, although not limited thereto.

While the hall sensor or the position sensor detects the operating protrusion 159, the main controller 11 may turn on the water discharge valve 190, and, while the operating protrusion 159 is not detected by the hall sensor or the position sensor, the main controller 11 may turn off the water discharge valve 190.

As another case, while the operating lever 150 does not rotate downward, the hall sensor or the position sensor may detect the operating protrusion 159 to generate a first detection signal, and, while the operating lever 150 is pressed downward to rotate and the operating protrusion 159 approaches the hall sensor or the position sensor, the hall sensor or the position sensor may detect the operating protrusion 159 to generate a second detection signal. The first detection signal and the second detection signal may be different detection signals. The hall sensor or the position sensor may transmit the second detection signal to the main controller 11, and the main controller 11 may control opening and closing of the water discharge valve 190. After the operating lever 150 returns to the position before being pressed, by the elastic member, the hall sensor or the position sensor may generate the first detection signal.

Accordingly, in a case in which the contact sensor or the pressure sensor generates the second detection signal according to an operation of the operating lever 150 while water is discharged through the water discharge opening 141 because the water discharge valve 190 opens the water discharge flow path 195, the main controller 11 may turn off the water discharge valve 190, the water discharge flow path 195 may be closed, and no water may be discharged through the water discharge opening 141. In a case in which the contact sensor or the pressure sensor generates the second detection signal according to an operation of the operating lever 150 while no water is discharged through the water discharge opening 141 because the water discharge valve 190 closes the water discharge flow path 195, the main controller 11 may turn on the water discharge valve 190, the water discharge flow path 195 may open, and water may be discharged through the water discharge opening 141, although not limited thereto.

While the hall sensor or the position sensor generates the second detection signal, the main controller 11 may turn on the water discharge valve 190, and, while the hall sensor or the position sensor generates the first detection signal, the main controller 11 may turn off the water discharge valve 190.

As such, because the water discharge unit 100 includes the water discharge mechanism 101 provided separately from the touch panel 190 and the water discharge mechanism 101 is positioned at an opposite side of the water discharge portion 140 and the touch panel 160 to be spaced from the water discharge portion 140 and the touch panel 160 that may be easily contaminated by a user's access and external water, it may be possible to prevent water from being discharged unintendedly by a user's mistake or external contamination.

Also, because the water discharge mechanism 101 has an outer appearance of a simple lever, turning on/off water by operating the water discharge mechanism may be more intuitive and easier to a user than turning on/off water by using the touch panel 160 providing various image buttons.

So far, a case in which the water discharge mechanism 101 is positioned above the head 130 has been described, although the disclosure is not limited thereto. The water discharge mechanism 101 may be positioned in the neck 120. The operating lever 150 may be rotatably coupled to the upper end or lower end of the lower case 121. Unlike the case in which the water discharge mechanism 101 of the water discharge unit 100 shown in FIG. 2 is positioned on the upper surface of the head 130, the water discharge mechanism 101 may be positioned on a side surface of the head 130 in FIG. 2. The operating lever 150 may be rotatably coupled to a side surface of the upper case 131. The water discharge mechanism 101 may be positioned at an arbitrary location of the body 110 as long as the water discharge mechanism 101 is spaced from the water discharge portion 140 and the touch panel 160. The operating lever 150 may be rotatably coupled to the case 111 at an arbitrary location on the case 111 as long as the operating lever 150 is spaced from the water discharge portion 140 and the touch panel 160.

The water discharge unit 100 may include the rotating device 200 for rotatably fixing the body 110 to the installing portion 3. The rotating device 200 may include a rotating bracket 202 being in a shape of a cylinder of which one end is rotatably coupled to the lower end of the neck 130, wherein a through hole 201 which the first tube 41 penetrates is formed in the rotating bracket 202, and a fixing member 203 which the rotating bracket 202 is inserted in and fixed to. More specifically, a screw thread may be formed in an outer side surface of the rotating bracket 202, and the fixing member 203 may be screwed to a lower end of the rotating bracket 202, like a nut, in a state in which the rotating bracket 202 penetrates the installing portion 3.

The water discharge unit 100 may include a drain hole 173 to prevent the water discharge mechanism 101 from being contaminated by external water of the water discharge unit 100.

The water discharge unit 100 may include a guide panel 170 forming the drain hole 173 and including a guide surface 172 for guiding water to the drain hole 173. The guide panel 170 may be coupled to the open upper end of the upper case 131 to form an upper surface of the water discharge unit 100. One end of the guide panel 170 may be connected to the touch panel 160, and the other end of the guide panel 170 may be connected to the drain hole 173. The guide panel 170 may be integrated into the touch panel 160.

The guide panel 170 may include a coupling hole 171 which corresponds to the stopper 155 and in which the coupling member 156 is inserted. The guide surface 172 may correspond to an inclined surface, wherein a height of the inclined surface is gradually lowered toward the drain hole.

At least one portion of the guide panel 170 may be positioned below the operating lever 150. The guide panel 170 may be spaced from the operating lever 150, and water may flow into the drain hole 173 through a space 175 between the guide panel 170 and the operating lever 150.

The guide panel 170 may be positioned between the touch panel 160 and the switch 157, and the drain hole 173 may be positioned between the guide panel 170 and the switch 157. More specifically, the drain hole 173 may be positioned between one end of the guide panel 170 and an outer wall 158b of the switch case 158. In other words, the guide panel 170 may form the drain hole 173 together with the switch case 158.

The drain hole 173 may be connected to a drain flow path 174 for draining external water of the water discharge unit 100 to inside of the body 110. The drain hole 173 may correspond to one end of the drain flow path 174. The drain flow path 174 may include a space between the guide panel 170 and the switch case 158. The drain flow path 174 may include a space between the second inner frame 132 and the switch case 158. The drain flow path 174 may include a space between the upper case 131 and the switch case 158. The drain flow path 174 may be positioned along an outer side surface of the outer wall 158b of the switch case 158. Water flowing along the drain flow path 174 may flow into the inside of the body 110, pass through inside of the upper case 131 and the lower case 121, and then be discharged to the outside of the water discharge unit 100.

As such, because external water of the head 130 is drained by the drain hole 174, it may be possible to prevent external water of the head 130 from entering the switch 157 to contaminate or damage the switch 157.

Figure 11:
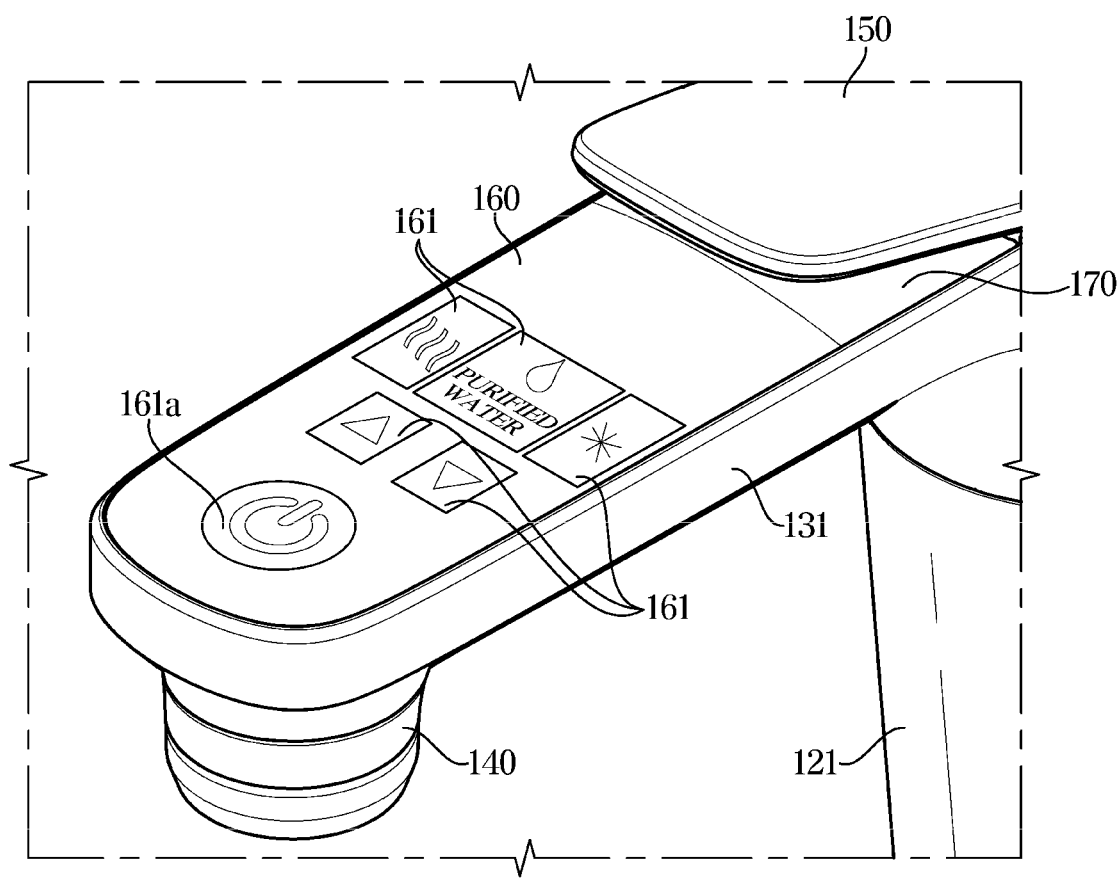
FIG. 11 shows another example of image buttons output on the touch panel of the water discharge unit shown in FIG. 2.

FIG. 11 shows another example of image buttons output on the touch panel of the water discharge unit shown in FIG. 2. Hereinafter, a description about overlapping parts will be omitted.

The touch panel 160 may include a water discharge button 161a. The water discharge button 161a may be provided as an image button. A user may receive water from the water discharge unit 100 by various methods by using the water discharge button 161a and the water discharge mechanism 101.

In a case in which the water discharge mechanism 101 operates by pressing only the water discharge button 161a without pressing an image button 161 for selecting an amount of water to be discharged and an image button 161 for selecting purified water, cold water, or hot water, the water discharge unit 100 may discharge water based on a default setting value. A setting value may indicate an amount of water to be discharged and a kind of water. A default setting value may indicate a preset amount of water to be discharged and a preset kind of water. A kind of water may be any one of purified water, cold water, or hot water. For example, by pressing only the water discharge button 161a among the image buttons of the touch panel 160 and then operating the water discharge mechanism 101, cold water of 120 ml may be discharged according to a default setting value.

Meanwhile, by operating the water discharge mechanism 101 without making a touch input on the touch panel 160, the water discharge unit 100 may discharge water based on a last setting value. A case in which no touch input is made on the touch panel 160 may be a case in which none of the image button 161 for selecting an amount of water to be discharged, the image button 161 for selecting a kind of water, and the water discharge button 161a is touched. The last setting value may indicate an amount and kind of water most recently discharged. Also, in a case in which the operating lever 150 of the water discharge mechanism 101 is continuously pressed, water may be continuously discharged according to the last setting value while the operating lever 150 is pressed.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the following claims.

What is claimed is:

1. A water purifier comprising:
   a water purifier body; and
   a water discharge unit including:
   a body including a neck that is coupleable to a sink and/or workbench, and a head having a proximal end connected to the neck, wherein the head longitudinally extends from the neck and has a water discharge opening at a lower side of a distal end of the head that is opposite to the proximal end of the head,
   at least one pipe extending through the neck and the head, through which water provided by the water purifier body is flowable to be discharged through the water discharge opening,
   a water discharge valve inside the body and configured to regulate water flowing through the at least one pipe,
   a water discharge mechanism coupled to an upper side of the proximal end of the head, and configured to be operated by a user to control the water discharge valve to control discharging of water through the water discharge opening, and
   a touch panel coupled to the upper side of the head and spaced apart from the water discharge mechanism, and configured to receive a touch input for controlling the water purifier body to selectively supply one of purified water, cold water, or hot water to the water discharge unit, and to receive a touch input for adjusting an amount of water to be supplied to the water discharge unit.

2. The water purifier of claim 1, wherein the water discharge mechanism is configured so that:
   the water discharge mechanism is operable by the user when no water is being discharged through the water discharge opening, to thereby cause water to be discharged through the water discharge opening, and the water discharge mechanism is operable by the user when water is being discharged through the water discharge opening, to thereby cause no water to be discharged through the water discharge opening.

3. The water purifier of claim 2, wherein the water discharge mechanism includes:

a switch configured to control the water discharge valve, and an operating lever rotatably coupled to the head and configured to operate the switch.

4. The water purifier of claim 3, wherein the operating lever is configured so that, upon pressing of an end of the operating lever in one direction by the user, the operating lever presses the switch to operate the switch.

5. The water purifier of claim 3, wherein the neck has first and second ends, the first end is coupleable to the sink and/or workbench, and, when the first end is coupled to the sink and/or workbench, the neck longitudinally extends upward, and the head longitudinally extends from the second end of the neck.

6. The water purifier of claim 5, wherein the touch panel is at least partially positioned at the distal end of the head.

7. The water purifier of claim 6, wherein the switch is below the operating lever.

8. The water purifier of claim 6, wherein the touch panel extends from the distal end of the head toward the proximal end of the head.

9. The water purifier of claim 5, wherein the water discharge unit includes a drain hole configured to prevent the switch from being contaminated by water from the water discharge unit.

10. The water purifier of claim 9, wherein the drain hole is between the touch panel and the switch.

11. The water purifier of claim 10, wherein the water discharge unit includes a guide panel forming the drain hole and including a guide surface guiding water to the drain hole, and the guide panel is between the touch panel and the switch.

12. The water purifier of claim 11, wherein at least one portion of the guide panel is below the operating lever.

13. The water purifier of claim 3, wherein the water discharge unit includes a stopper supporting the operating lever and limiting a rotation range of the operating lever.

14. The water purifier of claim 13, wherein the operating lever includes a cover, and a coupling plate detachably coupled to a lower end of the cover and rotatably coupled to the head, and the stopper penetrates the coupling plate.

15. The water purifier of claim 1, wherein the touch panel is configured to receive:

a touch input for selecting purified water, a touch input for selecting cold water, a touch input for selecting hot water, and a touch input for selecting an amount of water to be discharged.

16. The water purifier of claim 1, wherein the water discharge mechanism includes a lever configured to be operated by the user to control the water discharge valve to control discharging of water through the water discharge opening.

17. The water purifier of claim 16, wherein the touch panel includes a water discharge button that is operable by the user to control the water discharge valve to control discharging of water through the water discharge opening.

18. The water purifier of claim 1, wherein the touch panel includes a water discharge button that is operable by the user to control the water discharge valve to control discharging of water through the water discharge opening.

* * * * *